Nov. 21, 1967           C. F. WILLIAMS           3,353,356
VECTOR CONTROL SYSTEM, WHICH INCLUDES MEANS FOR INTRODUCING
AN AUXILIARY EXHAUST STREAM INTO THE
PRIMARY STREAM OF A ROCKET MOTOR
Filed June 14, 1965           2 Sheets-Sheet 1

Charles F. Williams INVENTOR.

BY

ATTORNEY

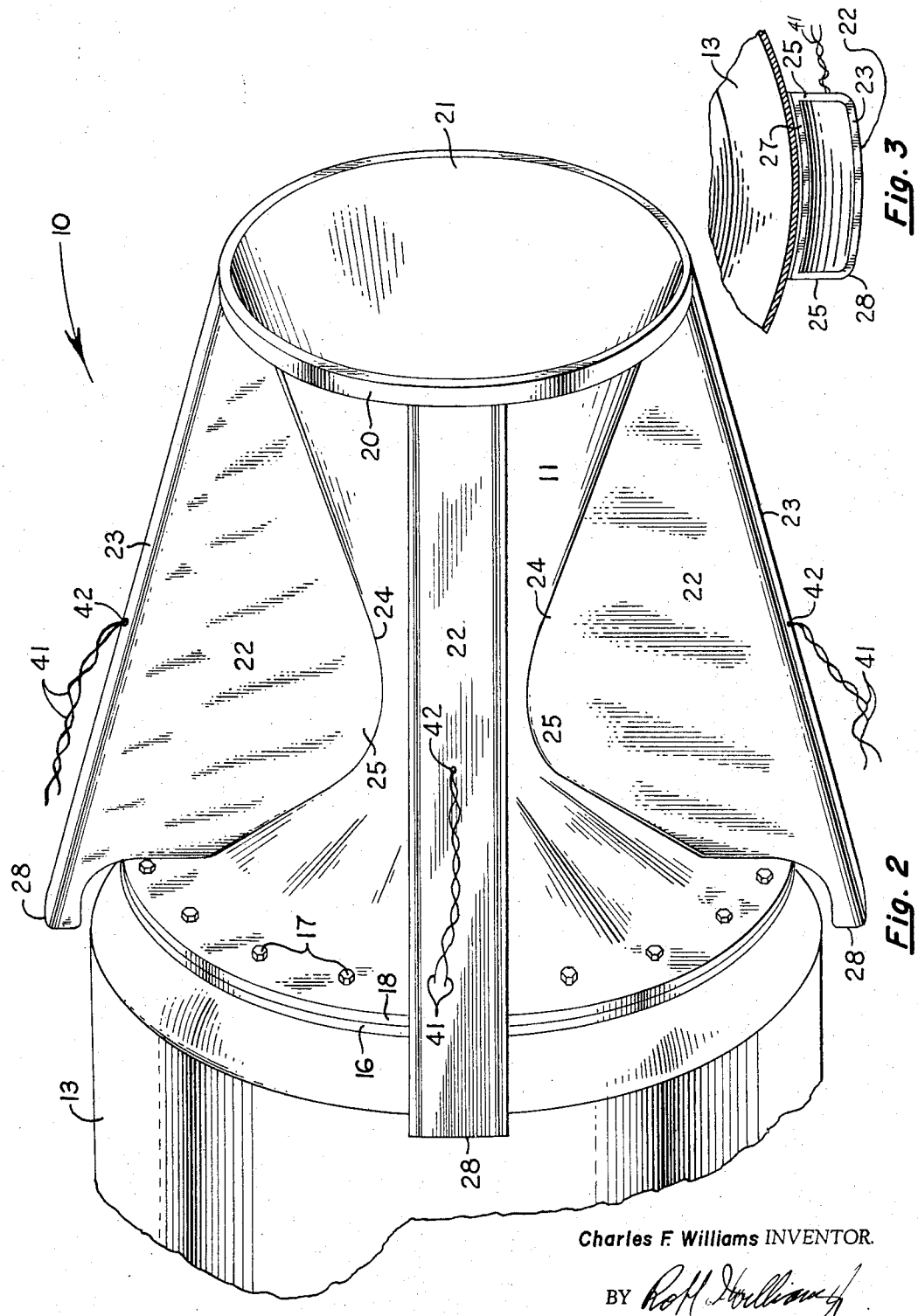

United States Patent Office 3,353,356
Patented Nov. 21, 1967

3,353,356
VECTOR CONTROL SYSTEM, WHICH INCLUDES MEANS FOR INTRODUCING AN AUXILIARY EXHAUST STREAM INTO THE PRIMARY STREAM OF A ROCKET MOTOR
Charles F. Williams, Huntsville, Ala., assignor to Thiokol Chemical Corporation, Bristol, Pa., a corporation of Delaware
Filed June 14, 1965, Ser. No. 463,563
8 Claims. (Cl. 60—231)

This invention relates to improvements in directional control systems for rocket motors, missiles, or other vehicles operating within the earth's atmosphere. Such a control system is commonly referred to as "thrust vector control," wherein directional control of a vehicle is achieved in the pitch, yaw and roll planes.

Fundamental laws of motion state that the path of travel of any moving body is a resultant of all force vectors acting on the body. Thus the path of travel, or flight trajectory, of a rocket motor or other vehicle may be controlled by varying the direction and magnitude of the thrust forces applied in relation to its longitudinal axis. There are many methods of achieving this control in rocket powered flight vehicles, i.e. canted nozzles, gimballed nozzles, jet deflectors mounted in the gas exhaust stream, aerodynamic surfaces, and primary or secondary fluid injection to deflect the exhaust stream. For unpowered bodies in flight, control is effected by external aerodynamic surfaces or by use of a secondary fluid, or by the instant invention which uses the air surrounding the body to augment the thrust of a cluster of auxiliary thrust chambers powered by a solid propellant fuel.

The basic advantage of secondary injection control is the elimination of appendages projecting into either the atmosphere or the primary fluid exhaust stream. The other methods, lacking this advantage incur a penalty of performance loss, or unwarranted increase in complexity and ultimate cost.

The instant invention overcomes these disadvantages by injecting the auxiliary fluid into the primary exhaust stream, actually increasing total thrust; and in addition augments this inherent improvement by using the fluid through which it is traveling to further improve the energy balance.

Attitude, or thrust vector, control is a significant factor in guided rocket motors and other atmospheric vehicles. The critical points of concern, for a control method to function at its best, are: inherent design simplicity, minimum additonal weight, and careful integration with the overall system functional requirements. The instant invention provides a configuration adaptability which allows achievement of control under near ideal conditions.

The instant invention uses a plurality of small solid propellant ducted rockets containing a propellant deficient in oxygen, containing only sufficient oxidizer to maintain combustion at a steady state. The oxygen deficiency is balanced, with a corresponding augmentation of thrust and exhaust velocity, by air supplied through an external air scoop. The accelerated combustion gases of the ducted rockets are injected into the primary exhaust stream of the rocket motor thereby providing a thrust vector and effectively achieving directional control of the vehicle trajectory. The degree and duration of the secondary vector is controlled through a conventional cold gas valve which varies the amount of air provided by the external air scoop.

The basic object of this invention is to provide a means of directional control of moving vehicles operating within the earth's atmosphere, through injection of an auxiliary high velocity hot gas stream into the primary exhaust stream of a rocket motor to provide a thrust vector of predictable direction, magnitude and duration.

It is another object of this invention to provide a means for introducing a plurality of auxiliary gas streams into the primary exhaust stream of a rocket motor to efficiently control movement in the pitch, yaw, and roll planes of a rocket motor.

A further object of this invention is to provide means for injecting a plurality of auxiliary gas streams into the primary exhaust stream of a rocket motor and also provide a continuously variable degree of control of the auxiliary gas streams by using a pulsed cold gas valve, or a variable orifice cold gas valve.

It is still a further object of the invention to provide a control system for a rocket motor that utilizes a plurality of ducted rockets to obtain the desired vector control for the rocket motor.

With the above and other objects and advantages in view the invention consists of the novel details of construction as will appear from the following description when taken in conjunction with the accompanying drawings wherein:

FIG. 2 is a perspective view of the control system of FIG. 1, taken approximately on the line 2—2 of FIG. 1 and;

FIG. 3 is a detailed fragmentary view partly in section, of the inlet end of an air scoop as taken on the line 3—3 of FIG. 1.

Figure 1:
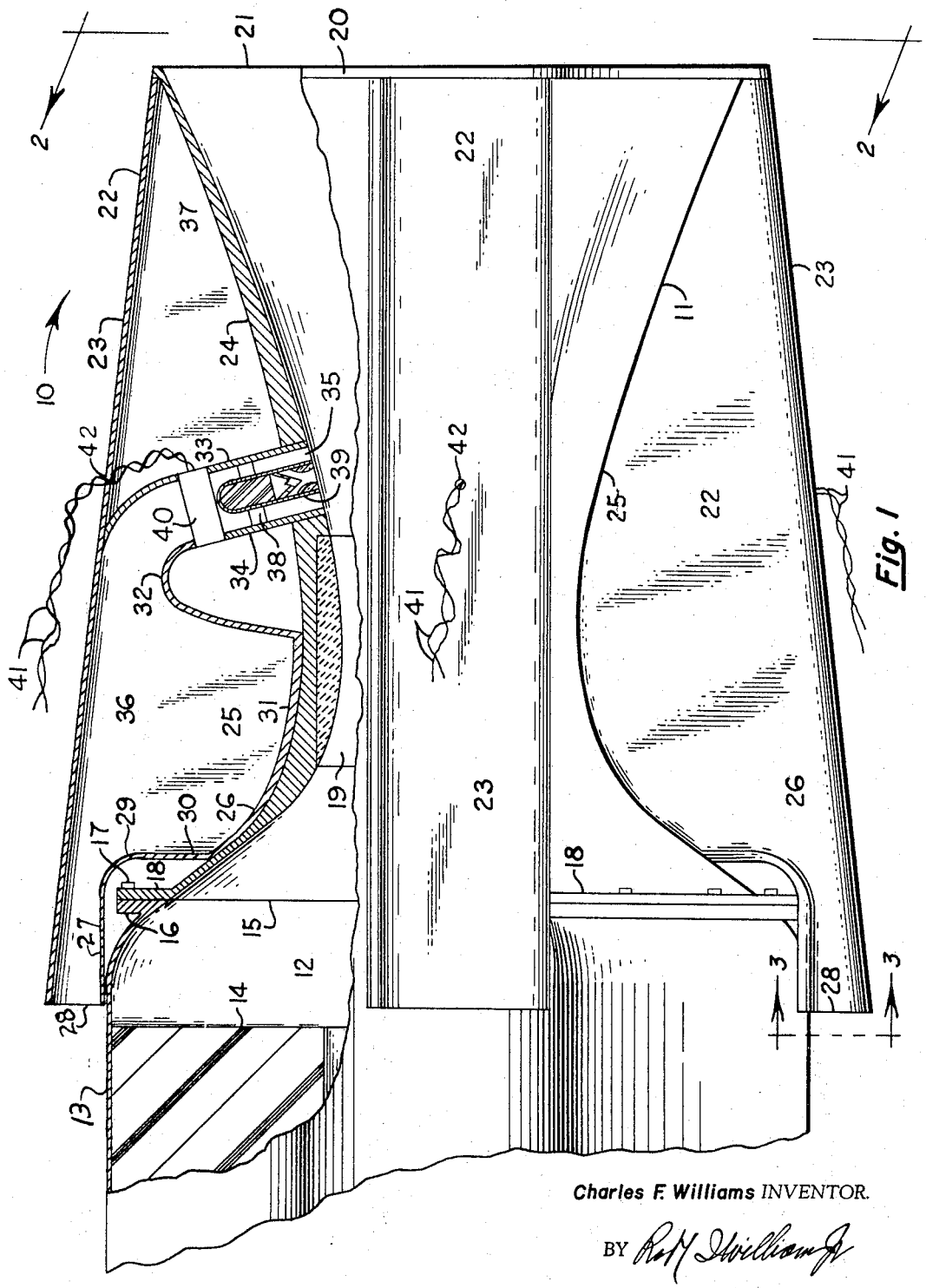
FIG. 1 is an elevational view, partly in section and partly broken away, of a control system embodying the instant invention as applied to the nozzle of a rocket motor.

Referring more in detail to the drawings wherein like parts are designated by like reference numerals, the reference numeral 10 is used to generally designate a control system embodying the instant invention.

Basically the control system 10 comprises a conventional convergent-divergent nozzle 11 through which the products of combustion created by the burning of solid propellant in the rocket motor are exhausted from the combustion chamber 12 of a rocket motor 13. The rocket motor 13 contains a conventional solid propellant grain 14, and is provided with an aft opening 15 that is bound by an outwardly directed annular circular flange 16 which is secured by a plurality of bolts or fasteners 17 to an outwardly directed annular circular flange 18 on the forward end of the nozzle 11. The nozzle 11, as is conventional, has a throat insert 19 and a circular annular rim 20 that is in circumjacent relation to the exhaust outlet 21 thereof.

Rigidly secured to the outer circumferential surface of the nozzle 11 are a plurality of radially disposed equally spaced air scoops 22, each of which has a flat straight outer or top surface 23 that inclines outwardly and forwardly with respect to the rocket motor 13 with the rear terminal edge thereof being contiguous with the annular rim 20 of the nozzle 11. It will be noted that the bottom edges 24 of the sides 25 of each of the air scoops 22 conforms to the contour of the outer surface of the nozzle 11, and a gas proof joint is provided between each of the bottom edges 24 of the sides 25 of the air scoops 22 and the outer circumferential surface of the nozzle 11.

Each of the air scoops 22 has a portion of the bottom thereof closed by an integral transversely extending bottom wall 26, FIG. 1. The bottom wall 26 has a portion 27 thereof that forms with the top surface 23 of the air scoop 22 and the sides 25 thereof an air intake 28.

The bottom wall 26 of each of the air scoops 22 extend inwardly of the mouths of the air intakes 28 to avoid the flange 16 on the rocket motor 13 where it is rigidly secured by fasteners 17 to the flange 18 of the nozzle 11. The bottom wall 26 of each of the air scoops 22 curve inwardly as at 29 to merge with a front wall portion 30 that extends inwardly to terminate contiguous and integral with a bottom wall portion 31 that conforms in shape with the contour of the bottom edges 24 of the sidewalls 25 of the air scoops 22 and the outer circumferential surface of the nozzle 11. A U shaped wall portion 32 then extends upwardly and rearwardly of the rear terminal edge of the portion 31 to form with a spaced and slightly curved portion 33 a gooseneck shaped air outlet mouth 34 which extends through an opening 35 in the wall of the nozzle 11 just aft of the throat insert 19 therein so that it provides communication between each of the air scoops 22 and the interior of the throat of the nozzle 11. The wall surfaces previously described in each of the air scoops 22 provides a forward plenum chamber 36. The aft chamber 37 in each of the air scoops 22 is sealed against the escape of gas from the plenum chamber 36 and therefore the aft chamber 37 does not in any way affect the operation of the air scoops 22.

A mounting means 38 in each of the gooseneck shaped outlet mouths 34 provides a support for a small ducted rocket 39 in each of the outlet mouths 34 so that the aft end of each of the ducted rockets 39 is contiguous with the terminal edges of the outlet mouths 34 and the surface of the throat of the nozzle 11.

Mounted in each of the outlet mouths 34 inwardly of each of the ducted rockets 39 is a conventional cold gas valve 40. The valves 40 are conventionally operated solenoid valves and control wires 41 that extend from each of the valves 40 outwardly of each of the air scoops 22 through openings 42 in the top surfaces 23 thereof to be connected to suitable controls for controlling the operation of the valves 40 as found necessary for the operation of the control system 10 embodying the invention.

In the operation of the control system 10, the ducted rockets 39 will be ignited upon the ignition and burning of the solid propellant grain 14 in the rocket motor 13. However, since the propellant in the ducted rockets 39 has a poor oxidizer content the propellant will only smolder and will not come to full power until the valves 40 are opened to permit the air that has been trapped and compressed in the plenum chamber 36 to exit outwardly of the air scoops 22 through the outlet mouths 34.

The ducted rockets 39 which operate in the manner described in Patent 3,173,249 are properly designed as to size, propellant composition and operating attitude to be properly coordinated with the size and specific impulse that will be required to properly control the rocket motor 13. The ram jet action for the required quantities of air that are necessary to burn the propellant in the ducted rockets 39 is obtained from the speed of travel achieved by the rocket motor 13, such speed forcing the air into the plenum chamber 36 through the air intakes 28 of the air scoops 22.

As thrust vectoring is required by the operation of the control system 10 one or more of the valves 40 are opened to permit the air trapped in the plenum chamber 36 to eject outwardly of the air scoops 22. The additional air circulating around the ducted rockets 39 causes the propellant in the ducted rockets 39 to increase its burning rate thus causing the ducted rockets 39 to come to full power and inject into the main exhaust stream of the rocket motor 13 the required number of auxiliary exhaust streams as will be necessary to obtain thrust vector control of the rocket motor 13. As previously stated, the high velocity gases caused by the increased burning rate of the propellant in the ducted rockets 39 are injected into the main exhaust stream of the rocket motor 13, to control side vector as well as the roll of the rocket motor 13. The valves 40 are operated remotely from a land based or on board guidance control system by suitable programming, depending on the efficient operation of the mission on which the rocket motor 13 is being flown.

The control system 10 provides extremely efficient vectoring forces, requires only low operating pressures, eliminates the requirements for complex hot gas valves and also eliminates the disadvantages that are inherent in the other methods of thrust vector control previously referred to herein.

It is believed that from the foregoing description the structure and mode of operation of the control system embodying the invention will be clear to those skilled in the art and it is to be understood that changes in such construction and mode of operation may be adhered to provided such changes fall within the spirit of the invention and the scope of the appended claims.

Having thus described the invention what is claimed as new and desired to be secured by Letters Patent is:

1. In a rocket motor having a combustion chamber, a fuel within said combustion chamber for creating combustion exhaust products therein, a nozzle for the exit of the main exhaust stream of said combustion products from said rocket motor, a vector control system comprising a plurality of air scoops mounted on the nozzle and extending longitudinally thereof, and having communication with the interior of said nozzle, means in said air scoops providing a plenum chamber therein, and an ignitable ducted rocket in each of said air scoops positioned to inject auxiliary exhaust streams into the main exhaust stream flowing through the nozzle, said ignitable ducted rocket in each of said air scoops being selectively operable to provide thrust vector control for the rocket motor.

2. The system as in claim 1 wherein remotely operated valves are positioned in said air scoops to control the injection of the auxiliary exhaust streams therefrom.

3. The system as in claim 1 wherein the nozzle is a convergent-divergent type of nozzle and each of said air scoops are contoured along the inner longitudinal edges thereof to conform to the configuration of said nozzle.

4. The system as in claim 1 wherein said nozzle is provided with a throat insert and the auxiliary exhaust streams are injected into said nozzle aft of said throat insert.

5. The system as in claim 1 wherein each of said air scoops is provided with an air intake portion that terminates forwardly of said nozzle.

6. The system as in claim 2 wherein each of said air scoops is provided with a goose necked shaped outlet mouth and means is provided for mounting said valves therein.

7. The system as in claim 6 wherein means is also mounted in said outlet mouth to mount said ignitable ducted rocket therein.

8. The system as in claim 1 wherein the means for providing a plenum chamber in each of said air scoops comprises a transversely extending wall structure outlining the bottom of said air scoops and the intake and outlet mouths thereof.

References Cited

UNITED STATES PATENTS

| | | | |
|---|---|---|---|
| 2,943,821 | 7/1960 | Wetherbee | 60—35.54 X |
| 3,020,709 | 2/1962 | Bertin et al. | 60—35.6 |
| 3,066,485 | 12/1962 | Bertin et al. | 60—35.54 |
| 3,095,694 | 7/1963 | Walter | 60—35.6 |
| 3,173,249 | 3/1965 | Wiggins | 60—35.6 |
| 3,233,833 | 2/1966 | Bertin et al. | 239—265.23 |

CARLTON R. CROYLE, *Primary Examiner.*